June 2, 1964  E. F. MICHL  3,135,643
DECORATIVE LAMINATES
Filed May 31, 1960

Inventor:
Edward F. Michl,
by His Attorney.

United States Patent Office 3,135,643
Patented June 2, 1964

3,135,643
DECORATIVE LAMINATES
Edward F. Michl, Coshocton, Ohio, assignor to General
Electric Company, a corporation of New York
Filed May 31, 1960, Ser. No. 32,653
6 Claims. (Cl. 161—79)

This invention relates to decorative laminates, to a process of preparing the laminates, and to a surface coating composition therefor. More specifically, this invention relates to decorative laminates whose abrasion resistance is greatly enhanced by the application of a silica containing surface coating composition to the print sheet of the laminate.

This application is a continuation-in-part of my copending application S.N. 653,656, filed April 18, 1957, and now abandoned.

Decorative laminates having surfaces possessing a wide variety of desirable properties have become well known. However, because of the increasingly widespread use of these laminates in such applications as surfacing materials for sinks, tables, desks, appliances and other articles of both commercial and home use, the demands upon these laminates have become more and more exacting. No single property of the laminates is perhaps more vital than its wear or abrasion resistance and yet improvement in this property has stubbornly resisted solution. The principal reason for this resides in the multitude of seemingly inconsistent properties which the surface of the decorative laminate must simultaneously possess. Any improvement in abrasion resistance has almost always been accompanied by an adverse effect on one or more of the remaining properties of the laminate surface.

A conventional decorative laminate comprises three essential parts: a wear surface layer, a print or pattern layer beneath the wear surface layer, and a core layer supporting the wear surface and pattern layers. Insofar as the problem of abrasion resistance is concerned, the critical part of the decorative laminate is, of course, the wear surface layer. This wear surface layer almost universally consists of a sheet of translucent overlay paper impregnated with a thermosetting resin, usually a melamine resin. This overlay paper is generally a very high quality, thin sheet of paper manufactured from purified viscose rayon fibers, cellulose fibers or other similar material, or from combinations of the foregoing materials.

Siliceous materials have heretofore been used in coating compositions, in general, to improve abrasion resistance. However, if siliceous materials are incorporated in the coating composition used in the above-described decorative laminates, although improved abrasion resistance may be achieved, the result is generally a decorative laminate with poor craze resistance, poor print clarity, surfaces which are brittle, or, in many cases, a combination of more than one of the foregoing deficiencies. Thus, attempts to use siliceous materials including silica, silicates, glass fibers, clay, or asbestos, although successful in increasing abrasion resistance, are not successful to the extent that these materials have always resulted in adversely affecting one or more of the remaining properties of the laminate surface. One of the primary reasons for the foregoing difficulties has been found to reside in the fact that the overlay sheet prevents the homogeneous dispersion of the siliceous material in the resin. The overlay paper, in effect, acts as a filter for the siliceous material. After, for example, impregnating an overlay paper with a resin containing the finest ground silica flour, the impregnated overlay sheet contains a silica-rich resinous coating on the top and bottom surfaces, and a silica-poor resinous composition in the middle. Actual abrasion tests on such a laminate have shown that the abrasion resistance is high on the top of the surface, becomes extremely low in the middle of the overlay, and again becomes high on the bottom surface of the overlay. If finer silica than ground silica is used (for example, silica aerogel), in an attempt to obtain uniform distribution of silica within the overlay sheet, a coating problem is encountered. The coating composition becomes so viscous that the overlay paper simply will not pick up a sufficient amount of resin; the resinous solution has such an extremely high viscosity that it will not soak into the overlay paper.

It is therefore a primary object of this invention to improve the abrasion resistance of decorative laminate surfaces without at the same time adversely affecting the remaining desirable properties of the laminate surface.

It is an additional object of this invention to provide a novel coating composition for decorative laminate surfaces which not only improves abrasion resistance but also improves print clarity of the laminates.

It is still another object of this invention to provide a process for producing decorative lamiantes which reduces raw material and labor costs by eliminating the need for the costly overlay sheet heretofore employed in the production of decorative laminates.

It is a still further object of this invention to reduce the total amount of print and surface layer resin used in the decorative laminate.

It has been found that the above and other objects of the invention may be achieved by the elimination of the costly overlay paper from the surface of the decorative laminate and substituting, for this overlay paper, a finely divided fibrous material having a refractive index which is substantially identical with that of the overlay paper. With the use of fibrous material in place of the conventional overlay paper, the difficulties encountered above may be overcome and a silica-containing coating composition may be used, which not only improves the abrasion resistance of the decorative laminate but also improves the clarity and print definition of the wear surface. One of the notable advantages of this discovery is the achievement of these improved results with a sharp cost reduction. The fibrous material used in this invention is considerably less in cost than the overlay paper previously employed and moreover labor costs involved in handling the overlay are eliminated. In addition, this invention enables the use of a smaller total quantity of resin. The reason for this is that less resin is needed to impregnate the print sheet. In the preparation of standard decorative laminates, a higher proportion of resin than was actually necessary was used for the overlay impregnating step because some of this resin invariably flowed down into the print sheet. In the preparation of the laminates of this invention, less flow takes place from the coating composition into the print sheet. As a result, in spite of the utilization of a smaller total resin quantity, a larger proportion of resin remains in the wear surface where the resin is most needed. It is desirable to have a larger resin quantity in the wear surface of the laminate because the resin itself has greater intrinsic abrasion resistance than either overlay paper or the finely divided fibrous material used in this invention. Furthermore, the intrinsic abrasion resistance, of the resin-silica combination is higher than the abrasion resistance of the resin itself. Hence the final surface wear layer resulting from this invention has very high intrinsic abrasion resistance together with substantial thickness.

Before one can grasp the full importance of the present invention, the function of the overlay paper in standard decorative laminates must be understood. The overlay sheet consists of overlay paper impregnated with the wear surface layer of resin. The overlay paper used in conventional laminates serves four essential functions.

(1) Primarily, the overlay acts as a carrier for the resin of the wear surface layer. This function is primarily a handling or processing function-that of a mechanical carrier of the resinous material. (2) The overlay paper also acts as a flow restricter. The fibers of the overlay paper function to restrain the flow of the surface coating resin to prevent, as much as possible, resin flow down into the print sheet. A certain minimum amount of resin must stay on top of the print sheet so that a proper distribution of resin on the surface results. (3) A third function of the overlay is that it acts as a shim by maintaining a certain essential thickness of the surface layer above the print sheet (ordinarily from 2 to 3 mils). The overlay plus resin can only be squeezed or compressed to a certain thickness, depending of course upon the pressure used and the density of the overlay sheet. If a thickness of 3 mils is desired, then a certain thickness and density of overlay sheet is employed to give this thickness. (4) The fourth function of the overlay paper is that of reinforcement. The use of a resin alone will result in a surface which is crazed or cracked. If an overlay paper is used together with the resin, the fibers of the overlay paper keep the resin together so that crazing or cracking of the resin is prevented.

It has been found that the above four functions may be carried out by using, in place of the overlay sheet, a surface coating composition containing finely divided fibrous material similar in composition to the fibers of the overlay paper. The use of such a surface coating composition permits the incorporation of an abrasion resistant material into the surface coating composition without deleterious side effects.

Briefly stated, the surface coating composition of this invention comprises a thermosetting resin, silica and a finely divided fibrous material having a refractive index approximating that of the thermosetting resin, said composition being clear and highly translucent in its cured condition. The process of this invention involves the steps of coating a thermosetting resin impregnated print sheet with the above surface coating composition comprising a thermosetting resin, silica and a finely divided fibrous material having a refractive index approximating that of the cured thermosetting coating resin. The impregnated and coated print sheet is then dried and a conventionally prepared core stock, in sheet form, is stacked in layer form with the dried print sheet above the core stock. The separate sheets are then molded at elevated temperatures and pressures into a composite laminate.

In the preferred practice of this invention, the silica, in the form of finely divided silica flour, and the finely divided fibrous material, advantageously cellulosic flock, are incorporated in the thermosetting resinous composition with which the surface or print sheet of the laminate is coated. A small percentage, on the order of from 1 to 3%, or even less, of a wet tack reducing aid such as sodium carboxymethyl cellulose, may then be incorporated into this silica-flock-resin composition in order to enhance the coatability of the composition. The wet tack reducing aid acts to change the coating composition from a stringy, tacky solution to one which is "short" without appreciably altering the viscosity. A "short" coating composition is one which breaks sharply and coats smoothly without excessive drag. The wet tack reducing aid thus improves coating consistency and eliminates stringiness. The print sheet, carrying the desired surface configuration or pattern, is first impregnated with a solution of a thermosetting resin and excess resin is removed. This wet impregnated print sheet is then coated with a water dispersion of the silica-flock-resin coating composition and passed through a drying oven. The core stock is prepared in conventional fashion by impregnating sheet material with a thermosetting resin and superimposing a plurality of the sheets on top of each other. The core and the single print sheet, coated, impregnated and dried as set up above, are then compressed into a laminate under heat and pressure without the utilization of the customary overlay sheet adjacent the print sheet.

In addition to the omission of the overlay sheet there are several steps which differ from conventional practice insofar as the process of preparing the print and surface sheets of the laminates of this invention are concerned. The quantity of impregnating resin used to impregnate the print sheet may be smaller than heretofore employed. In addition, it has been found preferable to dry the coated and impregnated print sheet to a higher state of cure than heretofore practiced in the making of decorative laminates. A lesser proportion of resin flows into the print sheet from the surface of the laminates, thus enabling a more economical use of the resin and, at the same time, maintaining a greater quantity of the resin in the surface of the laminate itself. In view of the fact that melamine resin, the resin most often used for the wear surface layer, is itself more abrasion resistant than the formerly employed overlay sheets, it can be seen that this processing technique enables the abrasion resistance of the surface of the laminates to be increased exclusive of the addition of the silica abrasion-enhancing ingredient. The print sheet will generally be a sheet of cellulosic or rayon paper with a sufficient amount of hiding power to render it substantially opaque. The pattern or print sheet should be substantially opaque so that the desired color and pattern combination is not diluted or obscured by the color of the paper and resin used in the core layer. The core layer is generally composed of a plurality of sheets of kraft or other paper impregnated with a core resin.

In order that those skilled in the art may better understand how the present invention may be practiced, the following examples are given by way of illustration and not by way of limitation. Where parts are mentioned, they are parts by weight.

EXAMPLE 1

Raw Materials

The melamine resin used in this example is a modified melamine-formaldehyde reaction product produced by the American Cyanamid Company, New York, N.Y., and sold under the trade name Cymel 428. It is white, free-flowing powder, specifically designed for the treating of paper to be used in decorative laminates. The resin is readily soluble in water or in alcohol-water solvents, and gives a clear colorless solution which is stable at 50% solids content for at least two days at room temperature. Typical properties of a 50% aqueous solution at 25° C. are as follows:

| | |
|---|---|
| pH | 9.0 to 9.3 |
| Viscosity (Gardner) | A to B |
| Solids at max. dilution, percent: | |
| In water | 26 |
| In 90/100 water/2B alcohol | 14 |

The silica used in this example is a finely divided, substantially pure white silica flour, produced by the Pennsylvania Pulverizing Company, Pittsburgh, Pa., and sold by them under the trade name "Ultra Silica." The silica is substantially pure silicon dioxide, having a maximum particle size of 6 microns, but having substantially no particles with a micron size of more than 1 micron. A typical analysis of this silica is as follows:

| | Percent |
|---|---|
| Silicon dioxide | 99.82 |
| Iron oxide | 0.012 |
| Aluminum oxide | 0.04 |
| Titanium oxide | 0.008 |
| Calcium oxide | Trace |
| Magnesium oxide | Trace |

The fibrous material of this example is a finely divided cellulosic flock produced by the Brown Company, Berlin, New Hampshire and sold under the trade name Solka-floc BW–200. This cellulosic flock is non-abrasive, relatively inert to acids, alkalis, and solvents. It is practically ashless and, bone dry, it is 99.5% cellulose. Physical properties of Solka-floc BW–200 are as follows:

| | |
|---|---|
| Brightness | 83 |
| Color | White |
| Approx. particle size, microns | 35 |
| Approx. screen analysis: | |
|     Percent through 100 mesh | 97 |
|     Percent through 200 mesh | 78 |
| Moisture _____percent | 7 |
| Specific gravity | 1.58 |
| Apparent dry density-lb./cu. ft. | 34 |

*Preparation of Coating Composition*

The formulation used for coating the impregnated print sheet is prepared from the following ingredients:

| | Parts |
|---|---|
| Melamine resin solids | 100 |
| Silica flour | 10 |
| Sodium carboxymethyl cellulose | 3 |
| Cellulosic flock | 20 |
| Water—sufficient to make a 70% solids content dispersion. | |

The resin is placed in a mixing vessel and all but a minor portion of the water is added to the resin. After mixing, the silica flour and flock are stirred into the mixture. The sodium carboxymethyl cellulose is then added to the mixture with the remainder of the water as a 10% water solution and thoroughly mixed.

*Core Stock*

The core stock is prepared from seven sheets of 11-mil kraft paper impregnated with a 50% solution of a standard alkaline catalyzed phenol-formaldehyde laminating resin. The final resin solids content of the core stock is 40% of the total weight of the core. These seven sheets are then oven-dried for a period of from 1 to 2 minutes at a temperature of from 140 to 170° C.

*Preparation of Print Sheet*

The process used in this example for impregnating and coating the print sheet of the decorative laminate and the distinctions between the finished laminates of this invention and that of the prior art will be better understood by referring, in the following description, to the accompanying drawing in which.

Figure 1:
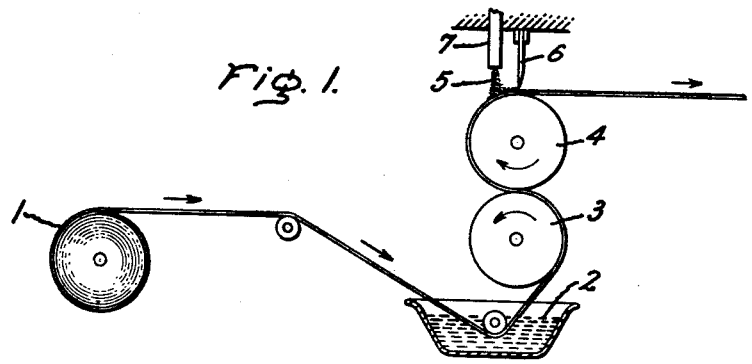
FIG. 1 is a diagrammatic illustration of one means for impregnating and coating a web of print paper in a continuous operation.

Referring to FIG. 1, the untreated print paper 1 consists of a continuous roll or web of suitably printed alpha paper. The print paper is impregnated with a 50% solids water solution 2 of the melamine resin used in the coating composition set out above. Print paper 1 is impregnated to a dry resin content of between 33 and 42%. This impregnated paper, while still wet, should not have an excess of solution on the surface, for an excess of solution would cause difficulty in coating. For this reason, the impregnated print paper is passed between nip rolls 3 and 4 to remove resin in excess of the 33 to 42% resin content.

The coating composition 5, prepared as above described, is then applied to the wet surface of the now impregnated print paper 1 by means of a knife coater 6 placed above top roll 4 of nip rolls 3 and 4. The coating solution is fed to the top of nip roll 4 by means of a feeder tube 7.

The impregnated and coated print paper is then passed through a forced air drying oven (not shown) containing a conveyor to support the web at a temperature of about 140 to 170° C. for from 3 to 5 minutes. The weight of dry coating is about 0.022 to 0.033 pound per square foot of print sheet. The volatile content of the dried print sheet should be in the range of from 2 to 5%, and preferably from 2 to 3%.

The core and print sheets are then cut to size. The coated print sheet is placed above the seven sheets of core stock, and the coated and impregnated sheets are laminated between polished, stainless steel panels under heat and pressure in conventional laminating fashion. Times will ordinarily vary from 20 to 25 minutes for this laminating step, the temperature will vary from 130 to 150° C., and the pressure from 1000 to 1500 p.s.i. The laminates are cooled while still under pressure to below 40° C. and removed from the press.

Figure 2:
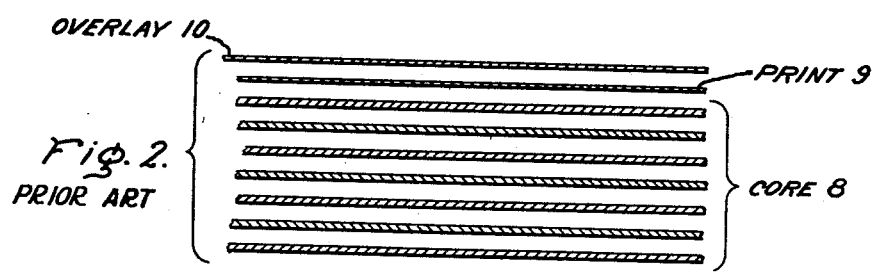
FIG. 2 is an exploded view of a laminate made in accordance with prior art practice.
Figure 3:
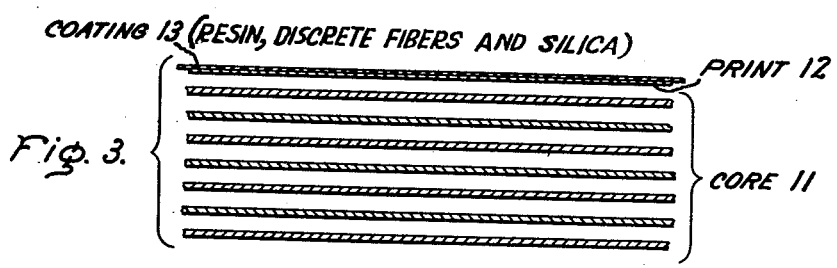
FIG. 3 is an exploded view of a laminate made in accordance with this invention.

FIGS. 2 and 3 illustrate exploded views of the laminates of the prior art and of this invention, respectively. Referring to FIG. 2, it can be seen that the core 8 comprises seven sheets. Print sheet 9 is between overlay sheet 10 and core 8. In FIG. 3, illustrating a laminate of this invention, core 11 is identical to core 8 of FIG. 2. Print sheet 12, however, forms the top lamina and there is no overlay sheet above the print sheet. Instead, the surface of print sheet 12 is coated with the silica containing coating composition of this invention, and this coating 13 forms the surface of the laminate.

Eight samples of laminates were prepared in accordance with the above Example 1. The only variables in the surface coating were the flock content (10, 20 or 30 parts per hundred parts resin) and the thickness (from 1.9 to 2.9 mils) of the surface coating composition of the laminate. Abrasion cycle and abrasion rate tests were performed in accordance with the standards of the National Electrical Manufacturers Association (NEMA), test LP2–1.06. Abrasion cycles are the number of cycles of an abrasive covered wheel in contact with the test sample necessary for breakthrough to occur. Abrasion rate is a measure of the number of grams of sample abraded off per hundred revolutions. NEMA standard specification for minimum wear value (abrasion cycles) is 400. The NEMA specification for maximum abrasion rate is .08 gram/100 revolutions. Standard laminates having a melamine resin surface seldom have a wear value of over 500, with 550 being considered exceptional. The abrasion rates of standard laminates with melamine resin surfaces are rarely below .060 to .065. The results with the laminates of this invention, in both wear value and abrasion rate, exceeded both standard specifications and the results achieved with the best-known present decorative laminates. NEMA standards for moisture absorption are 6% by both thickness and weight. In all of the samples, the moisture absorption standards were met. Boil delamination was satisfactory for each sample tested.

In the following Table A, the cigarette resistance is tabulated for additional samples prepared as in Example 1, except that one part of carboxymethyl cellulose was used instead of 3 parts as in Example 1.

TABLE A

| | NEMA standard | Sample | | | |
|---|---|---|---|---|---|
| | | 1 | 2 | 3 | 4 |
| Cigarette resistance, sec | 110 | 140 | 140 | 135 | 132 |
| Film thickness, mils | | 2.0–2.1 | 1.7–1.9 | 1.9–2.1 | 2.3–2.5 |
| Boil delamination | | OK | OK | OK | OK |

EXAMPLE 2

This example illustrates the preparation of a decorative laminate having a wear surface layer comprising a phenolic resin. The phenolic resin used for coating the print sheet was a light-colored, thermosetting, general purpose phenol-formaldehyde resin sold by the Monsanto Chemical Company, Springfield, Massachusetts, under the trade name Resinox 470. The finely-divided fibrous material and the silica were the same as those used in Example 1. The print sheets were impregnated with an unplasticized melamine-formaldehyde reaction product produced by the American Cyanamid Company, New York, N.Y., and sold under the trade name Cymel 405. The phenolic resin coatings were applied to the impregnated print sheets and precured in an oven at 140° C. for two minutes, at which point they were tack-free. The coated and impregnated print sheets were then placed on a core stock comprising seven sheets of 11-mil kraft paper impregnated with a thermosetting phenolic resin to a 40 percent resin content. The build-up comprising the coated print sheet and the core stock was then cured in a platen press at 1500 p.s.i. at 135° C. for 25 minutes.

The following Table B indicates the abrasion rate of samples made in accordance with Example 2. As a control, Sample 1 in the table below contained no silica and no flock. Sample 2 contained flock but no silica.

TABLE B

| Sample | Flock content, parts/ hundred of resin | Silica content | Abrasion rate, gms./ 100 revolutions | Film thickness, mils |
| --- | --- | --- | --- | --- |
| 1 | 0 | 0 | .063 | 1.9 |
| 2 | 20 | 0 | .065 | 1.5 |
| 3 | 20 | 10 | .043 | 0.9 |
| 4 | 20 | 30 | .048 | 1.0 |

EXAMPLE 3

This example illustrates the preparation of a decorative laminate having a polyester resin wear surface layer. The polyester resin used for coating the print sheet was a general purpose, thermosetting polyester resin made from 2 moles of propylene glycol, one mole of maleic anhydride, one mole of phthalic anhydride. Seventy parts of this alkyd was copolymerized with 30 parts of styrene. The finely-divided fibrous material and silica were the same as those used in Example 1. The print sheet was impregnated as in Example 2. The impregnated print sheet was then coated with the above coating composition and dried in an oven at 70° C. for ½ minute, at which point it was tack-free. The coated print sheets were then placed on core stock prepared as in Example 2. The build-up was then cured in a platen press at 1500 p.s.i. at 110° C. for 15 minutes. This was followed by an additional 20 minutes at 135° C. to cure the melamine resin in the print and the phenolic resin in the core. The following Table C indicates the abrasion rate of samples made in accordance with Example 3. As in Table B, Sample 1 contained no silica and no flock. Sample 2 contained flock but no silica.

of their high abrasion rate. It is, therefore, of considerable importance to note that the abrasion rate of samples containing a polyester resin in the wear surface layer prepared in accordance with the present invention (Samples 3 and 4) possessed an abrasion rate which is below that considered standard for wear surfaces containing melamine resins, which are considerably harder than polyester resins. As above set out, abrasion rate measures the number of grams abraded off per hundred revolutions. A low abrasion rate is thus indicative of high abrasion resistance.

EXAMPLE 4

A formulation for coating a print sheet, impregnated as in Example 1, was prepared from the following ingredients:

| | Parts |
| --- | --- |
| Melamine resin solids (Cymel 428) | 100 |
| Silica flour | 10 |
| Sodium carboxymethyl cellulose | 0.25 |
| Cellulosic flock | 20 |
| Water—sufficient to make a 65% solids content dispersion. | |

The silica flour used in the above formulation was a mixture of two finely divided, substantially pure white silica flours, produced by the Pennsylvania Pulverizing Company, Pittsburgh, Pa., and sold by them under the trade name "25 Micron Silica" and "Opal Silica." The mixture consisted of three parts of 25 Micron Silica and one part of Opal Silica. The typical chemical analysis of these silicas is the same as that given in Example 1 for Ultra Silica. The silica was further purified to remove trace color impurities. The 25 Micron Silica has substantially no particles with a size larger than 30 microns and has an average particle size by weight of 7.2 microns. The Opal Silica has substantially no particles with a size larger than 40 microns with an average particle size by weight of 11.9 microns. These particle sizes were determined by a sedimentation test procedure used for determining sizes of particles too small for measurement by ordinary screen analysis. A dilute water suspension of the silica particles is made. The specific gravity of the suspension is then determined by a soil-test hydrometer as the silica particles settle to the bottom of the suspension. The larger particles settle faster and by suitable correlation of time, temperature and specific gravity, the particle size is determined.

The cellulosic flock used in the above formulation was prepared from a white, substantially pure cellulosic sulphite pulp which was cut into a long fiber flock and then ground in a ball mill for 6 hours and then passed through a 145 mesh screen.

The resin, silica flour, carboxymethyl cellulose and flock were mixed. The coating was applied and a laminate prepared as in Example 1.

The following Table D records the results of abrasion tests on five laminate samples prepared in accordance with Example 4. Sample 1 below was prepared as set out above in Example 4; the remaining samples differ only with respect to flock and silica content and film thickness.

TABLE C

| Sample | Flock content | Silica content | Abrasion rate | Film thickness, mils |
| --- | --- | --- | --- | --- |
| 1 | 0 | 0 | .097 | 5.0 |
| 2 | 20 | 0 | .091 | 5.1 |
| 3 | 20 | 10 | .059 | 4.6 |
| 4 | 20 | 30 | .049 | 4.7 |

TABLE D

| Sample | Flock content, parts/ hundred of resin | Silica content, parts/ hundred of resin | Abrasion cycles | Abrasion rate | Film thickness |
| --- | --- | --- | --- | --- | --- |
| 1 | 20 | 10 | 1,127 | .024 | 2.7 |
| 2 | 20 | 20 | 1,342 | .019 | 2.7 |
| 3 | 20 | 30 | 1,555 | .016 | 2.6 |
| 4 | 15 | 10 | 1,036 | .025 | 2.5 |
| 5 | 25 | 10 | 1,196 | .024 | 2.7 |

It should be noted that polyester resins are rarely used for the wear surface layer of decorative laminates because The following Table E illustrates the abrasion test results of various laminates, prepared as set out in Example 4, but having silica flour of varying particle range sizes.

TABLE E

| Silica particle size, microns | | Abrasion cycles | Abrasion rate | Film thickness, mils |
|---|---|---|---|---|
| Maximum [1] | Average [2] | | | |
| 50 | 13.0 | 1,192 | .022 | 2.3 |
| 45 | 11.9 | 1,163 | .021 | 2.2 |
| 35 | 9.6 | 1,125 | .022 | 2.4 |
| 30-35 | 9.2 | 838 | .025 | 2.1 |
| 25-30 | 7.2 | 780 | .028 | 2.1 |
| 15-20 | 5.1 | 765 | .039 | 2.4 |
| 10-15 | 3.6 | 607 | .041 | 2.6 |
| 5-10 | 2.6 | 585 | .051 | 2.5 |
| 5-10 | 2.8 | 547 | .048 | 2.6 |

[1] Maximum is here used to mean that over 99% by weight of the silica particles are of smaller micron size than the figure given as determined by the sedimentation test described above.
[2] Average is average particle size as determined by the sedimentation test and calculated on the basis of the total weight of the silica flour.

The stain resistance of laminates made in accordance with this invention has been found to be superior to prior decorative laminates containing conventional coating solutions and overlay paper. The reason for this is believed due to the lower capillarity resulting from the absence of continuous fiber-to-fiber contact in the laminate surface. Thus, decorative laminates produced in accordance with this invention have proven resistant to such stains as blueing, iodine, bleach, lye, silver nitrate, and gentian violet, all of which will ordinarly stain standard laminates containing an overlay sheet. The heat resistance of laminates produced in accordance with this invention has been found to be approximately the same as that of standard laminates.

The wet tack reducing aid is, as outlined above, a processing aid. However, successful laminates have been prepared both with and without this ingredient and, although it is preferable to include a wet tack reducing aid in the coating composition, it may be omitted as shown by Examples 2 and 3 above. Any water soluble thickening agent, which is non-reactive with the other ingredients of the coating composition and which does not gel during formulation and coating is useful to reduce wet tack. In addition to sodium carboxymethyl cellulose, the water soluble gums such as gum arabic may be used. Other useful thickening agents are methyl cellulose and polyvinyl alcohol. Others will occur to those skilled in the art.

The resins used for impregnating the core sheet of laminates prepared in accordance with this invention may be those thermosetting resins conventionally used in the production of decorative laminates. The most common of these resins is a condensation product of a phenol and an aldehyde, and generally an alkaline catalyzed phenol formaldehyde condensation product. However, as previously stated, the core stock of this invention may be varied in accordance with the properties desired and the manner of preparation of the core is not considered a critical part of this invention.

The resin for impregnating and coating the surface is preferably a condensation product of melamine and an aldehyde because of the excellent wear properties of these resins, their translucency, and resistance to yellowing. However, resins prepared from other aminotriazines, urea, dicyandiamide, light, highly purified phenolic resins, polyester resins such as the unsaturated alkydvinyl monomer type, ethoxyline, etc., may also be used. Additional melamine resins which can be used are more fully described in U.S. Patent 2,605,205 issued July 29, 1952.

The silica useful in this invention is preferably a finely-divided silicon dioxide, substantially free of extraneous color. Naturally occurring silica in the form of silica flour has been found to give excellent results. The maximum particle size of the silica is limited by processing rather than product considerations. Thus, silica flour possessing a substantial number of silica particles in excess of about 2 microns has been found to abrade the press pans of the laminating press. At the same time, these larger size silica flours result in higher abrasion resistance of the decorative laminates. There is virtually no lower limit to the particle size. However, no advantage seems to accrue from the use of very fine particle silicas, as for example the silica aerogels. The particle size of the silica will therefore depend on the amount of abrasion resistance desired on the laminate surface and the degree of press pan abrasion which can be tolerated. Amounts of silica greater than about 30 parts, by weight, per 100 parts of resin solids introduce a problem of haze. As little as 5 parts has a beneficial effect on wear resistance.

The finely-divided fibrous material may, in general, be any fibrous material whose refractive index approximates that of the cured coating resin. The refractive index is important if a highly translucent surface is to be obtained, for if the fiber and the cured resin differ markedly in refractive index, the fiber will be visible as such in the coating and a hazy or cloudy surface will result. The refractive index of the cured melamine resin used in Example 1 above is from 1.63 to 1.65. The refractive index of the cellulosic fiber is approximately 1.57. The refractive index of air is 1.00. This explains why the fibers are visible in air but not in the cured composition. The refractive index difference between air and that of cellulosic fiber, being 0.57, is too great to render the fibers highly translucent or transparent in the finished decorative surface. It is difficult to state with exactness the difference in refractive index beyond which transparency becomes too poor. The transparency requirements will vary with the type of decorative laminate prepared and with the pattern of the print sheet. It is only necessary that the fibrous material have a refractive index which is such that the coating composition will be clear and highly translucent after it is subject to heat and pressure. It is, however, believed that a refractive index difference between fiber and cured resin as large as 0.25 may be tolerated without obscuring the surface.

In view of the fact that previous overlay sheets were rendered highly translucent in the finished laminates, the fibrous material of this invention will, in general, include any finely divided material from which prior overlay paper was made provided the remaining characteristics as to refractive index and size are met. Cellulosic flock is a preferred fibrous material. In addition to cellulosic flocks, fibrous material useful in this invention includes cotton, rayon, viscose rayon, glass etc.

The fiber size is limited at its upper limit, as in the case of the silica, only by processing considerations. Too large or, more accurately speaking, too long a fiber size results in an agglomeration of the fibers and an evenly distributed coating will not be obtained. The lower limits of fiber length are that at which the fiber length equals its width and thus is, in actuality, no longer a fiber but a particle. At this dimension, the fiber loses its fiber identity and therefore a substantial amount of its reinforcing properties. As a practical matter, it has been found preferable to use fibers capable of passing through a 100-mesh screen.

In so far as fiber quantity is concerned, it has been found that amounts less than about 10 parts, by weight, per hundred parts of resin solids, result in insufficient reinforcement and in variations in film thickness. Processing considerations in coating the print sheet make quantities greater than about 40 parts undersirable. A preferred range of finely divided fibrous material is about 20 to 30 parts, by weight, based upon 100 parts of resin solids.

The decorative laminates of this invention will find utility wherever prior conventional decorative laminates were used. They are, however, particularly adapted for use where high abrasion resistance and print clarity is desired.

It is obvious that many modifications and variations of the present invention are possible in the light of the above teachings. Laminating conditions, including times, temperatures and pressures may be widely varied in accordance with known procedures. Processes for the preparation of the core may likewise be widely varied and other cores than those specifically described, including hard board, chip board, plywood, vulcanized fiber, aluminum, etc., may be used in the practice of this invention. It is, therefore, to be understood that the invention should not be limited in any sense except as defined by the following claims.

What I claim as new and desire to secure by Letters Patent of the United States is:

1. An abrasion-resistant decorative laminate comprising a core and a single surface lamina positioned thereover, said surface lamina being coated with a composition comprising a thermosetting resin, silica and a finely-divided fibrous material in the form of discrete fibers having a refractive index approximating that of the cured thermosetting resin, said composition being clear and highly translucent in its cured condition.

2. An abrasion-resistant decorative laminate comprising a core and a single surface lamina positioned thereover, said surface lamina comprising a print sheat coated with a composition comprising a thermosetting resin, silica flour and a finely-divided fibrous material in the form of discrete fibers having a refractive index approximating that of the cured thermosetting resin, said composition being clear and highly translucent in its cured condition.

3. An abrasion-resistant decorative laminate comprising a core and a single surface lamina positioned thereover, said surface lamina comprising a print sheet coated with a composition comprising (1) 100 parts by weight of a thermosetting resin, (2) from about 5 to about 30 parts by weight of silica flour, (3) from about 10 to about 40 parts by weight of finely-divided cellulosic flock in the form of discrete cellulosic fibers having a refractive index approximating that of the cured thermosetting resin and (4) up to about 3 percent of sodium carboxymethyl cellulose, said composition being clear and highly translucent in its cured condition.

4. An abrasion-resistant decorative laminate comprising a core and a single surface lamina positioned thereover, said surface lamina comprising a print sheet impregnated with a thermosetting resin and coated with a composition comprising (1) 100 parts by weight of a melamine resin, (2) from about 5 to about 30 parts by weight of silica flour, (3) from about 10 to about 40 parts by weight of finely divided cellulosic flock substantially all of whose fibers are capable of passing through a 100 mesh screen, said cellulosic flock having a refractive index approximating that of the cured melamine resin, and (4) up to about 3% of a water soluble thickening agent, said composition being clear and highly translucent in its cured condition.

5. An abrasion-resistant decorative laminate comprising a core and a single surface lamina positioned thereover, said surface lamina being coated with a composition comprising a thermosetting melamine resin, finely divided natural occurring silica and finely divided discrete cellulosic fibers having a refractive index approximating that of the cured melamine resin, said composition being clear and highly translucent in its cured condition.

6. An abrasion-resistant decorative laminate comprising a core and a single surface lamina positioned thereover, said surface lamina comprising a print sheet impregnated with a thermosetting resin and coated with a composition comprising (1) 100 parts by weight of a melamine resin, (2) from about 5 to about 30 parts by weight of silica flour, substantially all of whose particles have a size of less than about 2 microns, (3) from about 10 to about 40 parts by weight of finely-divided cellulosic flock substantially all of whose fibers are capable of passing through a hundred mesh screen, said cellulosic flock having a refractive index approximating that of the cured thermosetting resin and (4) from about 1 to 3 percent of sodium carboxymethyl cellulose, said composition being clear and highly translucent in its cured condition.

References Cited in the file of this patent

UNITED STATES PATENTS

| | | |
|---|---|---|
| 1,825,877 | Loetscher | Oct. 6, 1931 |
| 2,038,345 | Cockrane | Apr. 21, 1936 |
| 2,359,097 | Elsey | Sept. 26, 1944 |
| 2,451,410 | Queeny | Oct. 12, 1948 |
| 2,613,156 | McGaffin | Oct. 7, 1952 |
| 2,642,409 | Cordier | June 16, 1953 |

FOREIGN PATENTS

| | | |
|---|---|---|
| 300,875 | Great Britain | Nov. 22, 1928 |
| 767,593 | Great Britain | Feb. 6, 1957 |